United States Patent [19]

Todd et al.

[11] Patent Number: 5,192,844
[45] Date of Patent: Mar. 9, 1993

[54] ROBOTIC TOOL ADAPTOR APPARATUS

[75] Inventors: Thomas Todd; Todd B. Skinner, both of San Diego, Calif.

[73] Assignee: Toddco General, Inc., San Diego, Calif.

[21] Appl. No.: 657,563

[22] Filed: Feb. 19, 1991

[51] Int. Cl.⁵ .................. B23K 3/03; B23Q 3/155
[52] U.S. Cl. ............................ 219/85.16; 403/322; 901/41; 901/42
[58] Field of Search .................. 901/41, 42, 30; 219/85.16, 85.18, 86.25, 86.31; 29/568; 403/299, 322, 325; 414/729, 730

[56] References Cited

U.S. PATENT DOCUMENTS

| 4,636,135 | 1/1987 | Bancon | 403/322 |
| 4,664,588 | 5/1987 | Newell et al. | 901/41 |
| 4,784,421 | 11/1988 | Alvité | 29/568 |
| 4,793,053 | 12/1988 | Zuccaro et al. | 901/41 |
| 4,815,780 | 3/1989 | Obrist | 901/41 |
| 4,993,139 | 2/1991 | Burry et al. | 901/41 |
| 5,010,228 | 4/1991 | Nishiwaki | 901/42 |
| 5,094,381 | 3/1992 | Amos et al. | 219/85.18 |

FOREIGN PATENT DOCUMENTS

282417 9/1988 European Pat. Off. ............... 29/568

Primary Examiner—Geoffrey S. Evans
Attorney, Agent, or Firm—Bernard L. Kleinke; Jerry R. Potts; William Patrick Waters

[57] ABSTRACT

A tool changing system having high current surface mount tools, such as a hot bar reflow soldering head. The tool changing system includes a mounting fixture for connecting and disconnecting the surface mounting tool to a robotic unit. A low profile, small diameter robotic tool adaptor is utilized for coupling a variety of different types and kinds of robotic units to the surface mount tool and to reduce lead to pad misalignment problem caused by non-copolanarity between the mounting surface of the robotic unit and the working surface of the surface mount tool.

18 Claims, 5 Drawing Sheets

ROBOTIC TOOL ADAPTOR APPARATUS

CROSS-REFERENCE TO RELATED APPLICATIONS

Copending U.S. patent application, entitled "ROBOTIC ARM TOOL MOUNTING APPARATUS AND METHOD OF USING SAME," filed concurrently herewith on Feb. 19, 1991, assigned Ser. No. 07/657,564 is hereby incorporated by reference as if fully set forth herein.

TECHNICAL FIELD

The present invention relates in general to a method and apparatus for facilitating the changing of robotic tools, and it more particularly relates to such a method and apparatus for facilitating the mounting of an electrical robotic tool, such as a hot bar reflow soldering head, to a robotic arm.

BACKGROUND ART

Robotic arms have been employed for positioning components onto printed circuit boards. In the precise position of the components, potential misalignment problems between the leads of a fine pitch component, such as a large scale integrated circuit, and the pads of a substrate site, such as a printed circuit board, can develop. The misalignment can be caused by the handling of the component or device prior to placement onto the printed circuit board. Also, there can be non-coplanarity between the device leads and the substrate site during placement, and in this regard, if the leads contact the substrate site other than substantially simultaneously, translational forces will result either moving the robotic arm or the location of the substrate itself. Moreover, misalignment can also be caused by movement induced by the reflow process itself. Therefore, it would be highly desirable for any robotic system utilized in surface mount technology to reduce greatly, if not eliminate entirely, such unwanted misalignment between the leads of an integrated circuit device relative to the pads of a printed circuit board.

Prior known robotic systems utilized for the placement and assembly of fine pitch devices onto printed circuit board substrates have proven less than totally satisfactory. Such systems have not successfully reduced or substantially eliminated the non-coplanarity problems between the fine pitch leads of the device and the substrate surface.

One attempted solution at solving the aforementioned non-coplanarity problem, has been the heated bar reflow soldering method. In this regard, in order to solve the non-coplanarity problem, a plurality of heated bars are brought into direct contact with the leads of the electronic device to apply heat to the pads of a printed circuit board and also to apply direct force to the leads of the device simultaneously therewith, to maintain lead alignment with the pads of the printed circuit board during a reflow soldering operation. While this attempted solution has proven satisfactory with standard pitch devices, the coupling of the hot bar tool via a tool adaptor to a robotic control source has caused other problems.

For example, conventional large scale integrated devices are generally rectangular in shape with a large number of fine pitch leads extending from all four sides of the body of the device. This type of device configuration requires a hot bar tool with a set of hot bars in a generally rectangular configuration for engaging simultaneously all the leads of the device. Also, in order to control accurately the heating process for each hot bar, separate thermocouples must be attached to each respective hot bar for monitoring its temperature. Thus, any tool adaptor coupling the hot bar tool to a robotic control source must include a plurality of connectors for supplying high current to each respective hot bar, and for carrying thermocouple information to the robotic control source.

The necessity for having a large number of connectors produces two unwanted and undesirable problems. Firstly, greater frictional forces must be overcome to connect the tool to the robotic unit. In this regard, by increasing the number of connectors, a greater contact surface area is established between the robotic control source and the tool adaptor itself. This in turn, results in a substantially greater force being required to engage and disengage the tool adaptor from the robotic control source.

Secondly, a greater distance is required between the working surface of the robotic tool and the mounting surface of the robotic unit. In this regard, in order to accommodate the high current connectors for energizing the individual hot bars, either the height or the diameter of the tool adaptor, must be increased.

Implementing solutions to the above mentioned problems has proven difficult, if not entirely impossible. In this regard, because of the larger contact surface area, greater frictional forces must be overcome to engage the tool adaptor with the robotic control source. However, the pneumatic power available through most conventional robotic control sources is generally limited and thus, larger driving mechanisms cannot be easily incorporated into prior known tool changing devices for engagement/disengagement purposes. Moreover, even when sufficient pneumatic power is available, adding a larger driving mechanism merely compounds the second problem mentioned above; namely, that either the height or the diameter of the tool adaptor must be increased to accommodate the larger driving mechanism. However, increasing the height or diameter of the tool changing device introduces still yet other problems.

With respect to increasing the height of a tool changing device, a greater distance is established between the distal end of the hot bar tool and the robotic arm attachment surface. This greater distance tends to magnify any non-coplanarity problems between the leads of an electronic device held by the tool and the substrate site during placement with attendant lead to pad misalignment. On the other hand, increasing the diameter of a tool changing device results in an off center low profile construction that not only decreases the payload weight of the robotic tool changing system, but also causes unwanted and undesired deflection errors. In this regard, the off center construction coupled with the increased weight results in forces from the robotic control source to the tool changing device being shifted or distributed unequally, thus inducing undesired deflection errors.

Therefore it would be highly desirable to have a new and improved robotic tool adaptor and system and method for connecting and disconnecting a surface mount processing tool, such as a hot bar reflow soldering head to a robotic control source to overcome the problem associated with using either high profile tool adaptors or large diameter low profile tool adaptors. Such a tool adaptor and system and method of using them should greatly reduce, if not entirely eliminate misalignment of the leads of a fine pitch electronic device during placement and soldering of the device relative to a substrate surface such as a printed circuit board.

DISCLOSURE OF INVENTION

Therefore the principal object of the present invention is to provide a robotic tool adaptor and system and method of using them for connecting and disconnecting a high current surface mount processing tool to a robotic control source and for helping to reduce, if not eliminate entirely, lead to pad misalignments induced by non-coplanarity problems when using such a system.

Another object of the present invention is to provide such a new and improved robotic tool adaptor and system which is relatively simple in construction and very convenient to use, and which can be manufactured at low cost.

SUMMARY OF THE INVENTION

Briefly, the above and further objects ad features of the present invention are realized by providing a new and improved robotic tool changing system and method for connecting and disconnecting a surface mount tool to a robotic unit. The system generally includes a low profile, small diameter robotic tool adaptor for connecting and disconnecting a surface mount tool, such as a high current hot bar reflow soldering head, to a robotic unit. The tool adaptor includes an upper robotic unit that is adapted to be attached to a variety of different types and kinds of robotic control sources and a lower tool coupling unit for supporting the high current surface mount tool, such as the reflow solder head. Thus, the present inventive tool changing system enables a high current device or tool, such as a hot bar reflow soldering head, to be attached to a robotic unit so that coplanarity problems between the pads of a printed circuit board and the leads of an electronic device transported by the robotic unit are substantially reduced, if not entirely eliminated. It also enables a variety of different types and kinds of robotic units to be coupled to the tool mounting device in a relatively fast and convenient manner. Additionally, the soldering system enables the tool mounting device to be connected and disconnected from the robotic unit without substantially reducing the payload weight of the robotic unit. Furthermore, by utilizing a low profile, small diameter robotic tool adaptor, lead to pad misalignment problems can be substantially reduced, it not entirely eliminated. Hence, the number of rejected parts due to improper alignment is greatly reduced, if not eliminated entirely.

BRIEF DESCRIPTION OF DRAWINGS

The above mentioned and other objects and features of this invention and the manner of attaining them will become apparent, and the invention itself will be best understood by reference to the following description of embodiments of the invention in conjunction with the accompanying drawings, wherein.

BEST MODE FOR CARRYING OUT THE INVENTION

Figure 1:
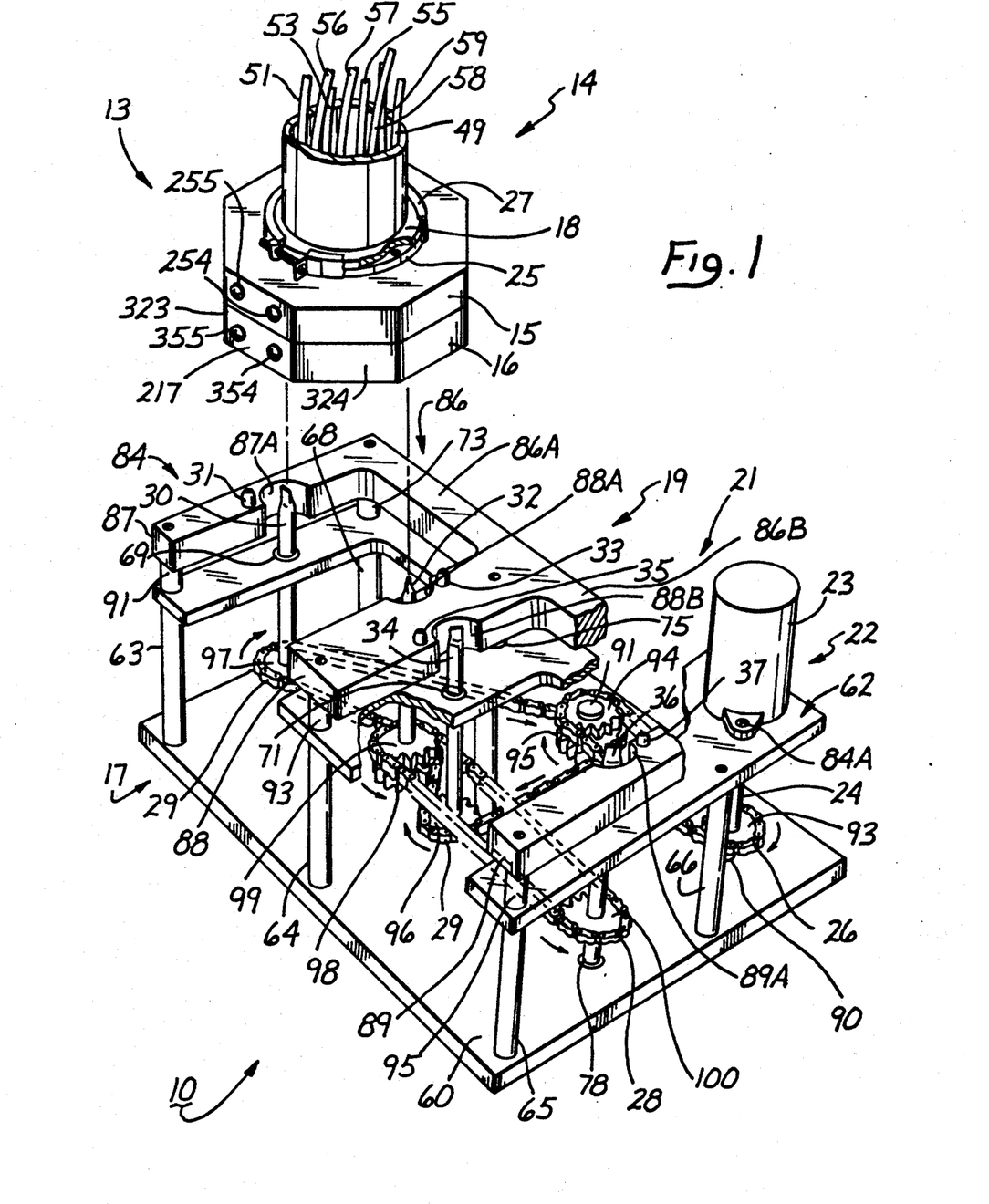
FIG. 1 is a partly fragmentary cutaway pictorial view of a robotic tool changing system which is constructed in accordance with the present invention and which is shown operatively associated with a robotic arm fragmentarily for illustrative purposes.
Figure 3:
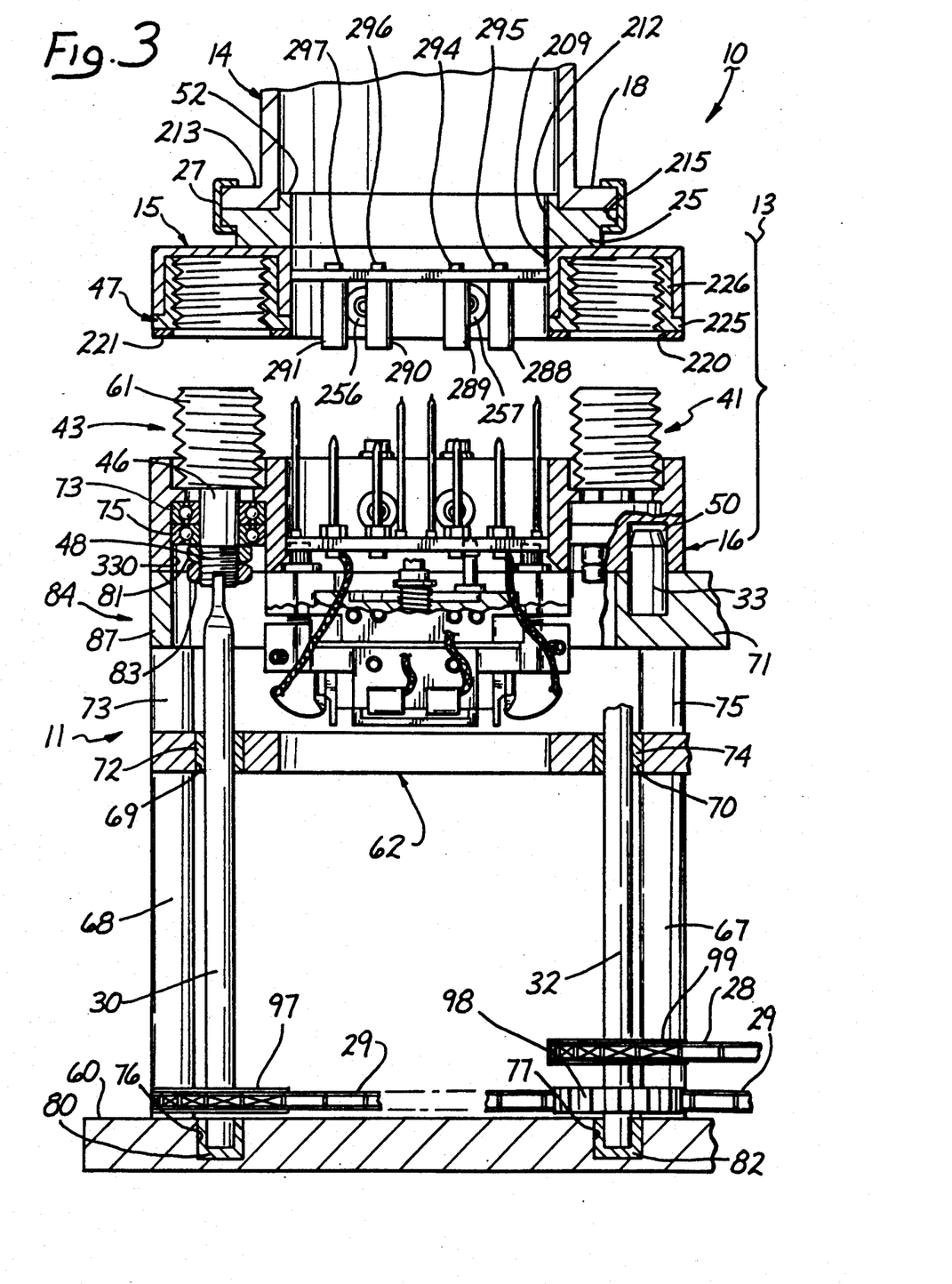
FIG. 3 is a partly fragmentary diagrammatic section view, of the robotic tool adaptor and tool changing system of FIG. 1 and which is shown operatively associated with a robotic arm shown fragmentarily and sectioned for illustrative purposes.

Referring now to the drawings and more particularly to FIGS. 1 and 3 thereof, there is shown a tool changing system 10 which is constructed in accordance with the present invention and which is shown in operative position for engaging a surface mount tool, such as a reflow soldering head 11 (FIG. 3). For illustrative purposes only, the system 10 is shown in use with a robotic unit 14, such as a model ULTRA #1 manufactured by Adept Technologies of San Jose, Calif.

The tool changing system 10 generally comprises a tool adaptor or changer 13 for coupling a surface mount tool, such as the reflow soldering head 11 to the robotic unit 14. For the purpose of helping to facilitate the connecting and disconnecting of the tool 11 to and from the robotic unit 14, the system 10 also includes a tool mounting fixture or assembly 17 having a plurality of tool changing stations, such as stations 19 and 21.

As best seen in FIGS. 1 and 3, the tool changer 13 includes a upper robotic section 15 and a lower tool section 16, which are adapted to be attached to the robotic unit 14 and tool 11 respectively. In this regard, the upper robotic section 15 includes a flanged centrally disposed annularly shaped universal coupler 25. The coupler 25 has a substantially smooth upper surface for mating with a annularly shaped mounting flange 18 disposed on the lower end of the robotic unit 14. A clamp 27 retains or secures the robotic unit 14 and the coupler 25 in mating engagement with one another. Because the coupler 25 is a universal robotic coupler, it enables the tool changer 13 to be attached to a variety of different types and kinds of robotic units, such as the robotic unit 14.

As will be explained hereinafter in greater detail, the tool changer 13 enables high current power, pneumatic power, cooling and heating fluids, as well as other tool operative connection paths such as temperature and pressure feedback paths, to be coupled to the tool 11 via the robotic unit 14. The above mentioned paths are established in a centrally disposed cavity C (FIG. 4) formed when the upper robotic section 15 and the lower tool section 16 are coupled together. The cavity C permits interconnections to be made in a low profile arrangement in order to minimize the axial distance between the mounting surface of the robotic unit 14 and the working surface of the tool 11. This arrangement thus, helps to maintain a parallel relationship between the working surface of the tool and the substrate surface to be engaged by the tool 11.

The lower tool section 16, as will be explained hereinafter in greater detail, is adapted to be secured releasably to the upper robotic section 15 in order to couple high current power and pneumatic power to the tool 11 in a low profile arrangement. In this regard, the tool 11 is mounted removably to the lower tool section 16, which in turn, is secured removably to the upper robotic section 15 without employing a stacked appendage type of arrangement. The low profile of the tool changer 13, coupled with its relatively small size and light weight, allows the robotic unit 14 to execute not only quick, rapid movements because of its low payload weight but it also helps reduce, if not completely eliminate, lead to pad misalignments due to non-coplanarity problems induced by robot to tool misalignments.

In order to permit the upper robotic section 15 and the lower tool section 16 to be connected and disconnected in a relatively fast and efficient manner, and without increasing the weight or profile height of the tool changer 13, each of the tool changing stations, such as station 19, are connected to a motor driven tool coupling arrangement shown generally at 22. The arrangement 22 includes a motor 23 coupled to a plurality of elongated gear bearing shafts or tangs 30, 32, 34 and 36 respectively.

Figure 2:
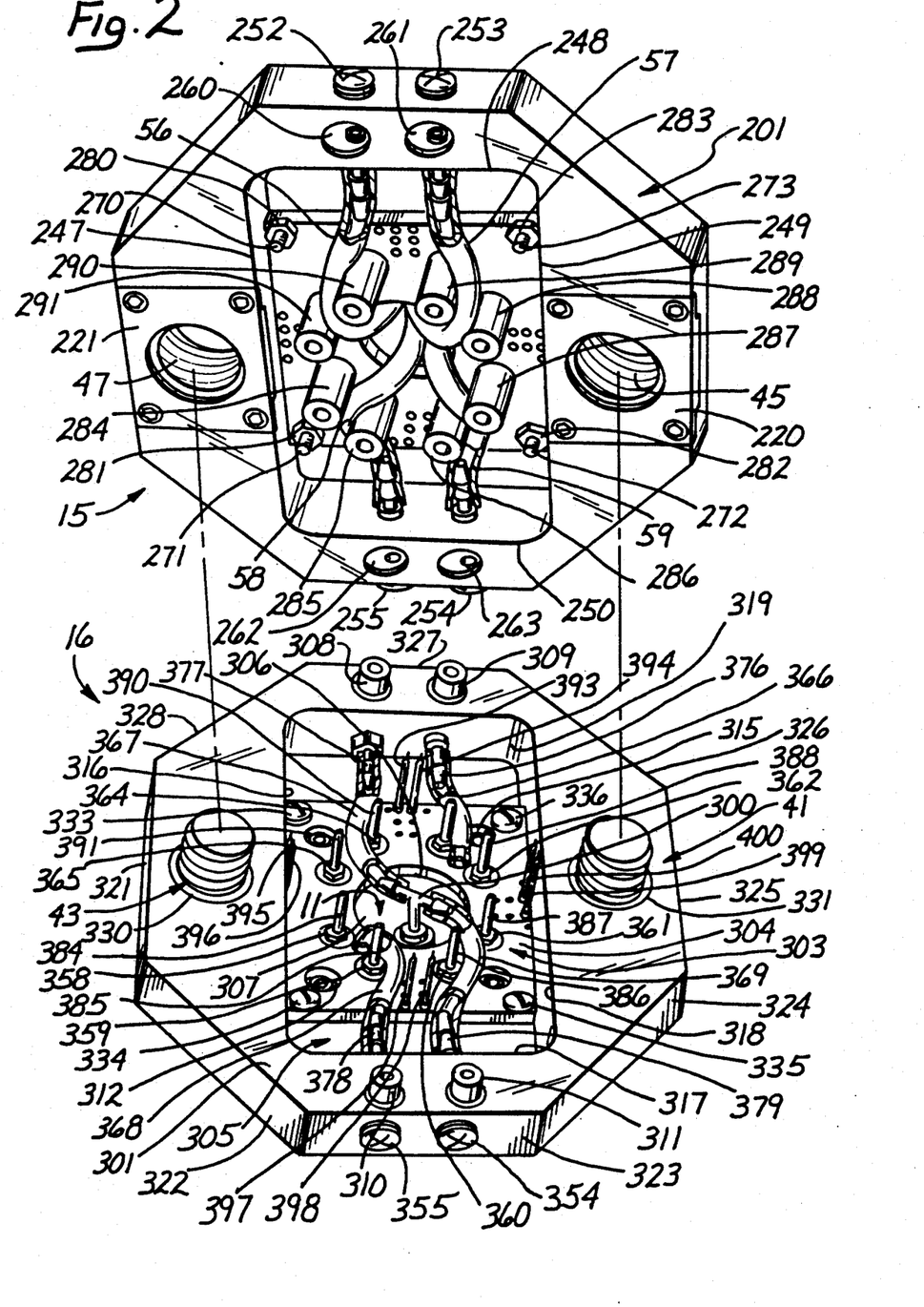
FIG. 2 is a greatly enlarged pictorial view of a robotic tool adaptor shown in FIG. 1 and which is shown operatively separate/d for illustrative purposes.

In order to secure releasably the upper robotic section 15 to the lower tool section 16, the lower tool section 16 includes a pair of spaced apart oppositely disposed slotted threaded bolts 41 and 43 (FIGS. 2 and 3). The bolts 41 and 43 are adapted to threadably engage a pair of corresponding nuts 45 and 47 mounted removably in the upper robotic section 15 as will be explained hereinafter in greater detail.

As best seen in FIG. 1, each one of the tool changing stations 19 and 21, include a pair of spaced-apart, oppositely disposed aligning pins 31, 33 and 35, 37 respectively. Each pair of the aligned pins, such as the pins 31 and 33, extend perpendicularly upwardly and are dimensioned to engage the lower tool section 16 as best seen in FIG. 3. In this regard, a user is able to accurately place the lower tool section 16 (and an attached tool, such as tool 11) on the mounting fixture 17 in a proprly aligned relationship for assembly purposes with the upper robotic section 15.

In operation, a user (not shown) manually secures a tool, such as tool 11, to the lower tool section 16 of the tool changer 13. Once the tool 11 has been secured to the lower tool section 16, the user places the lower tool section 16 and tool 11 in a selected one of the tool changing station, such as the tool changing station 19 on the mounting fixture 17. In this regard, a pair of alignment holes, such as a hole 50, are disposed in the tool section 16 permits the lower tool section 1 to be positioned on the fixture 17 in proper alignment with respect to the tangs 30 and 32. Prior to placing the lower tool section 16 on the fixture 17, the user first orients the lower tool section 16 in the station 19, so that the aligning pins 31 and 33 of station 19 are aligned with the lower tool section 16. The user then manually rotates the bolts 41 and 43 disposed in the tool section 16 to bring them in alignment to be received on the tangs 30 and 32 respectively. After the bolts 41 and 43 have been properly aligned, the user then places the lower tool section 16 onto the alignment pins 31 and 33 so that the lower tool section 16 is mounted in an aligned relationship with the tangs 30 and 32 and supported by the fixture 17.

For the purpose of attaching the tool 11 to the robotic unit 14, the robotic unit 14 is moved by means not shown between a plurality of discrete preset positions. While three positions will hereinafter be described, it should be understood that other positions may be utilized depending on the nature of the particular application of the system 10.

Once the user has positioned the lower tool section 16 and tool 11 on the fixture 17, the robotic unit 14 is lowered a short distance from its rest position, to a first or uppermost position (not shown) which is generally referred to as the coupling position, where the upper robotic section 15 of the tool adaptor 13 is attached to the robotic unit 14. In this regard the user position a lip portion 52 of the coupler 25 inside the annular opening of the robotic unit 14 and then secures the coupler 25 and robotic unit 14 together with the clamp 27. After the user attaches the upper robotic section 15 of the tool changer 13 to the robotic unit 14, the upper robotic section 15 is moved by the robotic unit 14 to a position directly above the lower tool section 16. This is referred to as the stationing position. The robotic unit 14 then lowers rectilinearly the upper robotic section 15 robotic section 15 to a short distance above one of the stations, such as station 19. At the lower position, the alignment of the upper tool section 15 and the lower tool section 16 is inspected visually, and positional adjustments can be made and monitored visually by means not shown. In this regard, the robotic unit 14 causes the robotic section 15 to be rotated about its longitudinal axis until the bolts 41 and 43 of the lower tool section 16 are aligned with the nuts 45 and 47 of the upper robotic section 15.

The third position of the robotic unit 14 is the lower most or engaging position, where the upper tool section 15 is lowered until the bolts 41 and 43 extending perpendicularly upwardly from the lower tool section 16 come into abutting contact with the nuts 45 and 47 respectively disposed in the upper robotic section 15. In this regard, the robotic unit 14 causes the upper section 15 to be further lowered rectilinearly to cause the bolts 41 and 43 to be brought into abutting engagement with the nuts 45 and 47.

Once the upper robotic section 15 and the lower tool section 16 have been properly aligned with one another, a controller (not shown) activates the motor 23, which in turn causes the tangs 30 and 32 to be rotated in opposite directions pulling the upper robotic section 15 into mating engagement with the lower tool section 16 Subsequent to the upper robotic section 15 and lower tool section 16 being secured together, the controller deactivates the motor 23. The user then causes the robotic unit 14 to move the tool changer 13 with the tool 11 attached thereto from the mounting fixture 17 so that the tool 11, may be utilized on an operative piece, such as a printed circuit board (not shown).

When the user has completed using the tool 11 or desires to attach a different type of tool to the tool changer 13, the user causes the robotic unit 14 to place the tool changer 13 with the tool 11 attached thereto on the fixture 17. The user then activates the motor 23, causing the upper robotic section 15 and lower tool section 16 to be disengaged from one another. In this regard, as the tangs 30 and 32 are rotated about their axes, the bolts 41 and 43 are disengaged threadably from their corresponding nuts 44 and 47 disposed in the upper robotic unit 15. When the upper section 15 and lower section 16 have been disengaged, the user causes the robotic unit 14 to move the upper robotic section 15 rectilinearly upwardly away from lower tool section 16 a sufficient distance to permit the user to easily and conveniently remove the lower tool section 16 and the tool 11 attached thereto from the fixture 17. Once the lower tool section 16 has been removed from the fixture 17, the user manually removes the tool 11 from the lower tool section 16 so that another or different tool (not shown) may be attached to the lower tool section 16.

Considering now the tool mounting fixture or assembly 17 in greater detail with respect to FIGS. 1 nd 3, the fixture 17 generally comprises a rectangularly shaped base member 60. The base 60 is adapted to rest on a support surface (not shown) during operation of the system of this invention. The base 60 includes a set of equally spaced apart mounting holes 76–78, aligned along a common axis and dimensioned for supporting in an upright manner the tangs 30, 32, 34 and 36 respectively. For the purposes of allowing each of the tangs to have unimpeded rotation within their associated mounting holes, a bearing is disposed in each hole, such as bearings 76 and 77 (FIG. 3).

As best seen in FIG. 3, in order to support the upper portion of each tang in an upright position, an alignment plate 62 is disposed above the base 60, and spaced apart therefrom by a set of threaded spacer 63–68. The alignment plate 62 includes a set of support holes, such as the holes 69 and 00 that are aligned with corresponding ones of the mounting holes, such as the holes 76 and 77. Each of the support holes is dimensioned to permit an associated tang to pass there through and to be supported. For the purposes of allowing unimpeded rotation of the tangs relative to the plate 62, each of the support holes, such as holes 69 and 70, is also adapted to receive in a friction tight fit a bearing, such as bearings 72 and 74 respectively.

The mounting fixture 17 also includes a mounting plate 84 for helping to facilitate the engagement of the upper robotic member 15 and lower tool member 16 together. The mounting plate 84 is mounted spaced apart from the motor 23 as well a the alignment plate 62. In order to support the plate 84 in a spaced apart manner from the plates 62, a set of parallel spaced apart spacers; such as spacers 91, 93 and 95 are disposed intermediate plates 62 and 84. The spacers 91, 93 and 95 for example, are disposed in corresponding alignment with spacers 63, 64 and 65 respectively. A similar set of spacers are disposed in corresponding alignment with spacers 66, 67 and 68, such as the spacers 73 and 75.

The mounting plate 84 has a unitary construction and is generally U-shaped with an intermediate bight portion 88 for helping to defines each one of the support stations 19 and 21. The U-shaped plate is defined by an integrally connected elongated member 86 disposed between a pair of spaced apart leg members 87 and 89. Tool changing station 19 is defined by the left leg member 87, a left portion 86A of the base member 86 and the bight portion 88. Tool station 21 is defined by the right leg member 89, a right portion 86B of the base member 86 and the bight member 88. As best seen in FIG. 1, the left leg member 87 includes a semi-circle cutout portion 87A for permitting the top of tang 30 to pass therethrough for engaging the lower tool section 16. A pair of similar cutout portions 88A and 88B are disposed in bight portion 88. The right leg member 89 also includes a similar cutout portion 89A. Each cutout 88A, 88B and 89A permits an associated tang 32, 34 and 36 respectively to engage the lower tool section 16.

Considering now the motor driven tool coupling arrangement 22 in greater detail with reference to FIGS. 1 and 3, the motor 23 is mounted to plate 62 by a set of mounting screws, that includes a screw 84A. The motor 23 includes a downwardly depending drive shaft 24 extending through a hole (not shown) disposed in the alignment plate 62 and terminating in a bearing 90 (FIG. 1) disposed within the base 60. The bearing 90 permits the unimpeded rotation of the shaft 24. A primary power gear 93 is mounted to the shaft 24 spaced apart from the base 60 so the gear may be rotated unimpededly. In this regard, when the motor 23 is activated, it causes the gear 93 to rotate in a clockwise direction as indicated by the arrow in FIG. 1.

For the purpose of establishing a drive path, a short shaft 91 is also mounted rotably within the base 60. The shaft 91 is mounted opposite the shaft 24 in a parallel spaced apart manner. A pair of spaced apart coupling gears 94 and 95 are mounted to shaft 91 for enabling the power driving force from the gear 93 be coupled to the tangs 30, 32, 34, and 36. In this regard a drive chain 26 couples gears 93 and 95 for causing the shaft 91 and the gear 94 to also be rotated in a clockwise direction as indicated by the arrow.

A gear 96 mounted on the lower portion of tang 34 adjacent to the base 60, allows the power driving force from gear 95 to be coupled to the tangs 30, 32, 34 and 36. In this regard, a drive chain 29 couples the gears 95 and 96 for causing the tang 34 to be rotated in a clockwise direction as indicated by the arrow in FIG. 1.

A similar set of gears 97 and 98 are disposed on the lower end of tangs 30 and 32 respectively, and are coupled to the power coupling gear 95 by the drive chain 29. As best seen in FIG. 1, the driven chain 29 is coupled to gears 97 and 98 to cause gear 97 to rotate in a clockwise direction and to cause gear 98 to rotate in a counter clockwise direction as shown by the arrows adjacent to tangs 30 and 32 respectively.

For the purpose of enabling tang 36 to rotate in counterclockwise direction, a transposition gear 99 is mounted above and spaced apart from gear 98 on the tang 32. The gear 99 operates in cooperation with a gear 100 disposed on the tang 36. In this regard, a drive chain 28 couples the gears 99 and 100 which both rotate in a counterclockwise direction as indicated by the arrows. From the foregoing it should be understood that each tang pair, such as tangs 30 and 32, associated with are rotated in opposite directions to reduce, if not substantially eliminates, any coupling forces that might otherwise be exerted against the robotic unit 14 during the time it is being connected with and disconnected from the tool 11.

Figure 4:
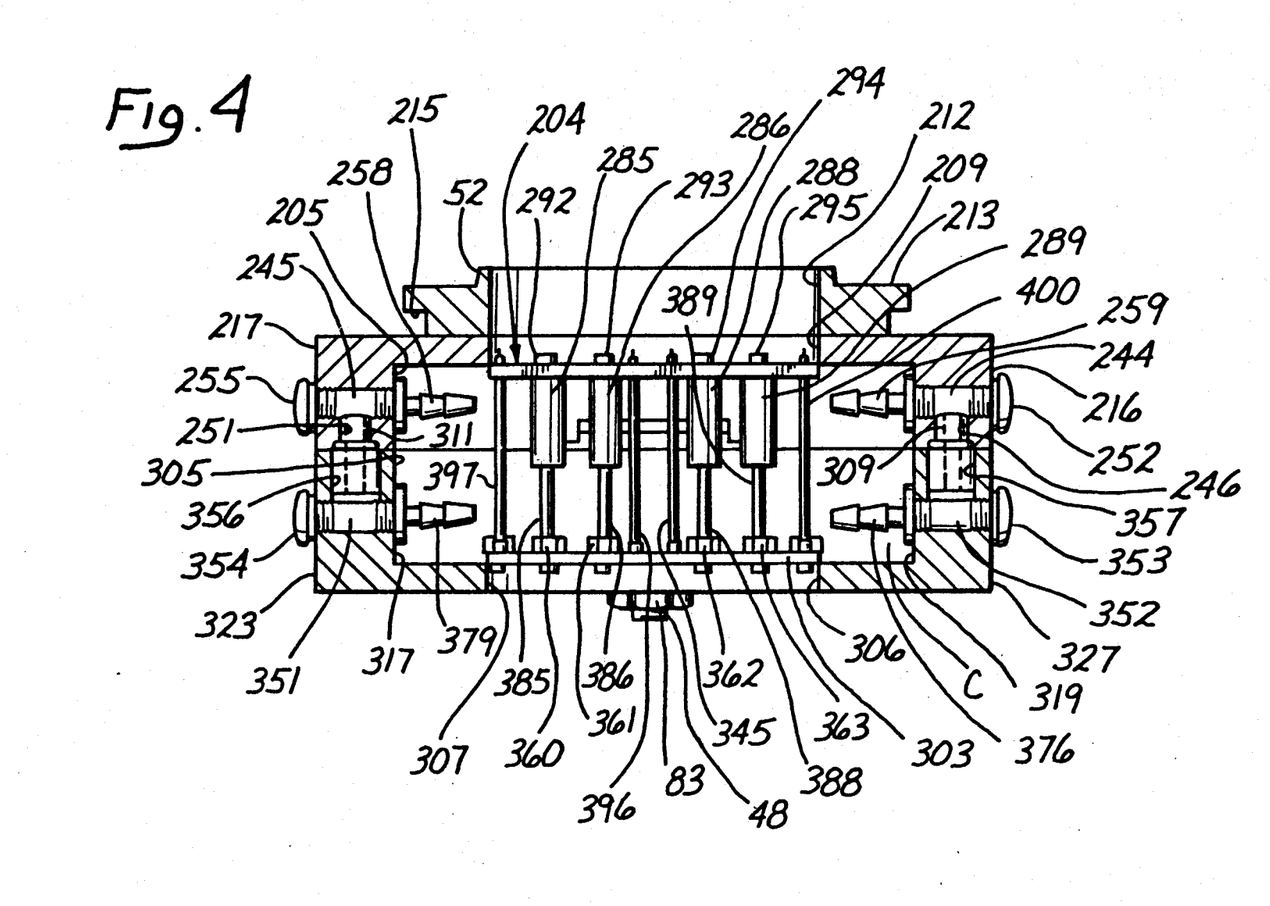
FIG. 4 is a diagrammatic section view of the robotic tool adaptor of FIG. 1, illustrated disconnected from the robotic unit.

Considering now the upper robotic section 15 in greater detail with reference to FIGS. 1-5, the upper robotic section 15 generally includes a octagon shaped robotic coupling block 201 and printed circuit board 203 (FIG. 5) for facilitating the attachment of the robotic unit 14 to the tool 11. The block 201 includes a large centrally disposed recess or opening 205 for mounting the printed circuit board 203 therein. In this regard the opening 205 is generally rectangularly shaped having four integrally connected peripheral walls 218, 219 and 228; 229 terminating in a base section 247 (FIG. 4).

A annular hole 209 is centrally disposed in the base section 247 to allow a large number of conductors to pass therethrough. In this regard, a large number of electrically and pneumatic conductors are illustrated in FIG. 1. For the purpose of illustration, only eight conductors have been shown, four electrical conductors 49, 51, 53 and 55 and four pneumatic conductors 56–59. It should be understood that many other conductors can be provided to the tool 11, such as thermocouple conductors and other electrical conductors not shown for clarity purposes. As will be explained hereinafter in greater detail, the electrical and pneumatic conductors disposed within the robotic unit 14 are connected to the upper robotic tool section 15 and more particularly, to the robotic coupling block 201 and printed circuit board 203 respectively.

As best seen in FIG. 1, the universal coupler 25 is mounted removably to the upper-surface of the block 201 by a set of bolts, such as the bolt 270, 271, 272, and 273. The universal coupler 25 is generally annular in shape and has centrally disposed opening 212 in its lower surface. The opening 212 has a diameter of sufficient radial distance to allow the electrical and pneumatic connectors from the robotic unit 14 to be coiled therein. In this regard, the robotic unit 14 can be rotated 360° degrees without affecting the electrical and pneumatic connectors between the tool adaptor 13 and the robotic unit 14. For clarity purposes the interconnections between the electrical conductors of the robotic unit 14 and the printed circuit board 203 have not been shown in FIGS. 3 and 4.

Considering now the universal adaptor 25 in greater detail with reference to FIG. 3, the opening 212 terminates in the lip 52 which is dimensioned to be matingly received within the interior of the lower end of the robotic unit 14. The lip 52 is integrally connected to a generally horizontal shoulder 213 for engaging a lower annularly shaped flanged portion 215 of the robotic unit 14. The shoulder 213 terminates in a downwardly depending step portion 25 for receiving the retaining clamp 27. In this regard, the retaining clamp 27 engages the upper surfaces of the flanged portion 18 and the step portion 215 to secure removably the robotic unit 14 to the robotic tool section 15.

Figure 5:
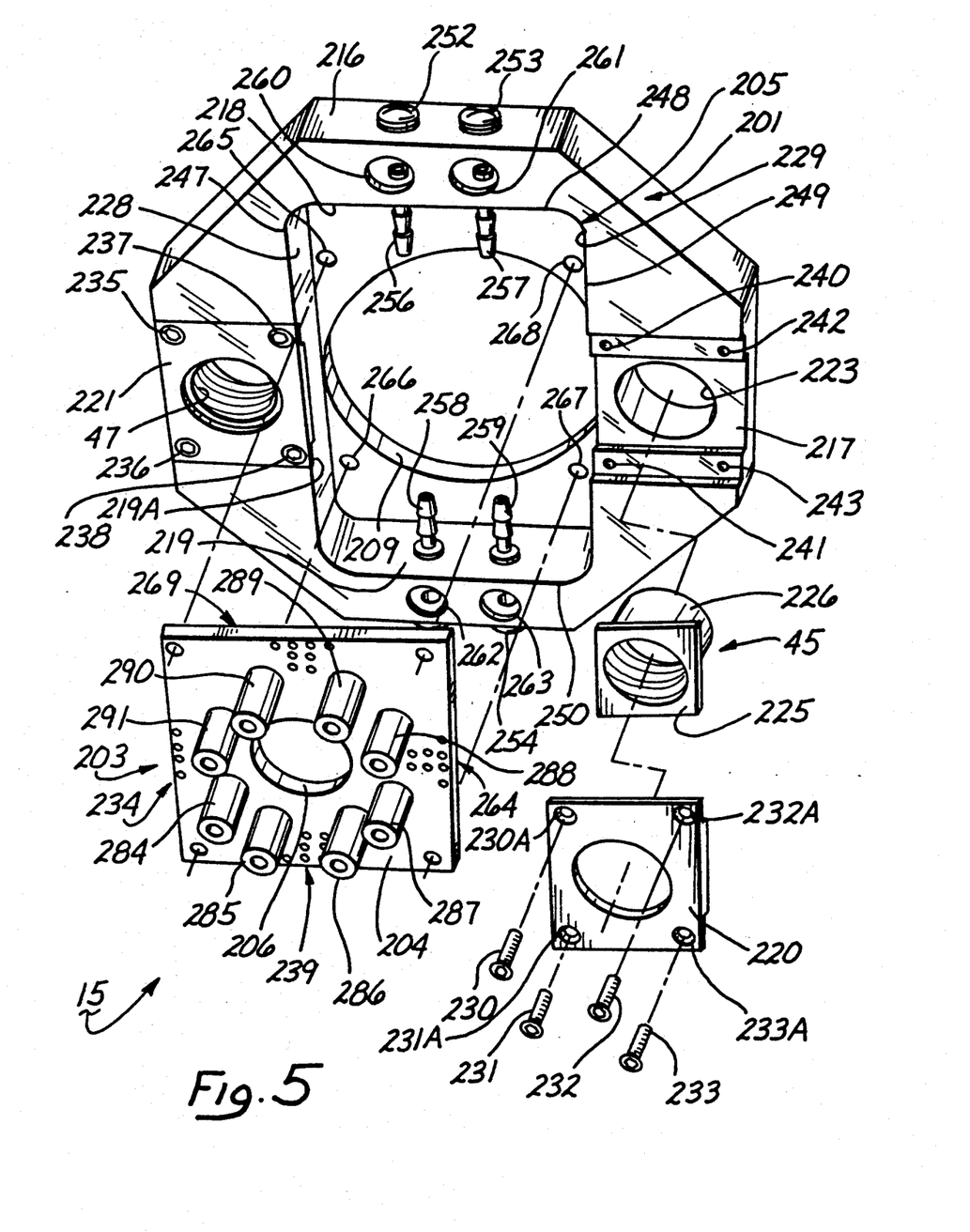
FIG. 5 is a exploded pictorial view of the upper portion of the robotic tool adaptor of FIG. 2.

Considering now the robotic coupling block 201 in greater detail with reference to FIGS. 2 and 5, the block 201 includes a pair of spaced apart oppositely disposed stepped recesses 217 and 219A for receiving therein a complementarily shaped cover 220 and 221 respectively. Recess 217 extends between the wall 229 of the opening 209 and the outer peripheral edge of the block 201. In a similar manner, the recess 219 extends between the opposite wall 228 and the opposite peripheral edge of the block 201. Each recess has a centrally disposed hole, such as hole 223, for receiving a nut, such as the nut 45, for helping to secure the upper robotic section 15 to the lower tool section 16. The nuts, such as nut 45, are secured within each of their respective holes by the covers 220 and 221.

Each of the covers 220 and 221 include a set of holes, such as the holes 230A-233A, for facilitating the mounting of the covers within the associated recesses 217 and 219A. In this regard, the covers 220 and 221 are mounted within recess 217 and 219A respectively, by a set of threaded screws 230-233 and 235-238 respectively. A corresponding set of threaded holes are disposed in each recess, such as holes 240-243, for receiving the screw to facilitate the mounting of the covers, such as cover 220 to the robotic block 201.

As best seen in FIG. 5, each nut, such as nut 45, includes an internally threaded cylindrical portion 226 integrally connected to a flange portion 225. The flange portion 225 retains the cylindrical portion 226 in the recess 217. The threaded cylindrical portion 226 is adapted to receive a bolt disposed in the lower tool section 16 as will be described hereinafter in greater detail.

For the purpose of establishing a fluid communication path between the robotic unit 14 and the tool 11, the robotic coupling block 201 also includes a set of primary passageways, such as passageways 244 and 245 (FIG. 4). The passageways extend between an outer peripheral surface of the block 201, such as surfaces 216 and 217 to corresponding walls 218 and 219 of the opening 205. A set of plugs 252-255 block one end of each passageway respectively while a set of fluid connectors 256-259 are disposed in the opposite ends of each passageway respectively. The connectors 256-259 are adapted to receive corresponding ones of the fluid conductors 56, 58, 57 and 59 respectively.

A set of transverse passageways, such as passageways 246 and 251, intersect each primary passageways 244 and 245 respectively. The traverse passageways each define annular outlet, such as outlets 260-263 in the undersurface of the robotic block 201. The outlets 260-263 are dimensioned to receive in a fluid tight fit a corresponding set of connectors 308-311 respectively, disposed in the lower tool section 16 as will be explained hereinafter in greater detail.

In order to mount the printed circuit board 203 within the recess 205, a set of holes 265-268 are disposed around the periphery of the opening 209. The holes 265-268 are dimensioned to receive therein a set of bolts 270-273 respectively. The bolts 220-273 pass through a corresponding set of holes 275-278 in the printed circuit board 203 for mounting purposes. As best seen in FIG. 2, a set of nuts 280-283 mount on the bolts 270-273 respectively, to secure the printed circuit board 203 within the recess or opening 205.

Considering now the printed circuit board 203 in greater detail with reference to FIG. 5, the printed circuit board 203 generally comprises a mounting board 204 having a centrally disposed annular opening 206. The board 204 is generally rectangularly shaped and is dimensioned to be received within the opening or recess 205. As best seen in FIG. 2, the annular opening 206 is sufficiently large to allow the fluid conductors 56-59 from the robotic unit 14, to freely pass therethrough for connecting purposes to connectors 256-259 respectively. A group of eight spaced apart high current female connectors 284-291 are disposed around the opening 206 in generally circular configuration. The connectors 284-291 extend through mounting holes (not shown) in the board 204, and are secured to the board 204 by a set of fasteners, such as the fasteners 292-297. The fasteners, such as fasteners 292-295 are adapted to receive and secure corresponding electrical conductors, such as conductors 49, 51, 53 and 55 respectively.

For the purposes of permitting thermocouple connections to be established between the tool 11 and the robotic unit 14, the board 203 also includes four groups of female thermocouple connectors shown generally at 234, 239, 264 and 269. Each group of connectors, such as group 269 includes 8 electrical connectors adapted to receive in a friction tight fit a number of thermocouple electrical pins disposed in the lower tool section 16. In the preferred embodiment, eight thermocouple pins are shown in the lower tool section 16 for mounting engagement with individual connectors in the thermocouple groups 234, 239, 264 and 269 respectively. It should be understood however that up to eight thermocouple connections can be established within each group.

Considering now the lower tool section 16 in greater detail with reference to FIG. 1-5, the lower tool section 16 generally includes an octagon shaped tool coupling block 301 and printed circuit board 303 for facilitating the attachment of the tool 11 to the upper robotic section 15. The block 303 is complementarily shaped to the robotic coupling block 201 and includes a large centrally disposed recess or opening 305 for mounting the printed circuit board 303 therein. In this regard, the opening 305 is generally rectangularly shaped having four integrally connected peripheral wall portions 316-319. As will be explained hereinafter in greater detail, a hole 307 is disposed in recess 305 intermediate a pair of oppositely disposed openings 312 and 315 for the purpose of permitting fluid connections to be made between the tool 11 and the lower tool section 16.

In order to mount the printed circuit board 303 within the recess 305 and in order to secure the tool 11 removably to the under surface of the block 301, a set of mounting holes (not shown) are disposed at each respective corner portion of the recess 305. A set of complementarily disposed mounting holes are also disposed in the printed circuit board 303. The mounting holes in the recess 305 and board 303 are adapted to receive mounting bolts 333-336 therein for securing the printed circuit board 303 and the tool 11 to the block 301.

Considering now the block 301 in still greater detail, the block 301 has eight integrally connected side wall portion 321-326 for defining the octagon shape of the block. For the purpose of mounting the bolts 41 and 43 in the block 301 a pair of mounting holes 330 and 331 are disposed on opposite sides of the recess 305 and intermediate wall portion 316, 321 and 318, 325 respectively.

Considering now the bolts 41 and 43 in greater detail each of the bolts 41 and 43 are substantially similar to one another so only bolt 43 will be described. As best seen in FIG. 3, bolt 43 includes an elongated shaft 46 having a threaded end portion 48 at one end thereof. The threaded end portion 48 includes a slot at its terminal end having a sufficient depth and width to receive therein the tang 30.

The opposite end of the shaft 46 terminates in an integrally connected threaded nut engagement portion 61 adapted to be threadably engaged with the nut 47. In this regard, it should be noted that bolt 43 and nut 47 each have a right handed threaded pitch, while bolt 41 and nut 45 each have a left handed threaded pitch. The opposite pitches are required as the bolts 41 and 43 are rotated in opposite directions to help reduce engaging forces on the robotic unit 14 when the upper robotic section 15 and the lower tool section 16 are engaged and disengaged.

A pair of bearings 73 and 75 are mounted in the hole 330 in order to permit the unimpeded rotation of shaft 46. In this regard, the bearings 73 and 75 are mounted between a pair of nuts 81 and 83 disposed on the threaded end portion 48 of the shaft 46 and a shoulder 85 disposed within the hole 330.

For the purpose at establishing a fluid communication path between the tool 11 and the upper robotic section 15, the block 301 includes a set of primary passageways such as passageways 351 and 352 extending from the respective outer peripheral walls 323 and 327 and the inner wall portions 317 and 319 respectively. A set of plugs, such as plug 353-355 block one end of each passageway respectively, while a set of fluid connectors 376-379 are disposed in the other end of each passageway respectively. The connectors 376-379 are adapted to receive a group of corresponding fluid conductors 366-361.

A set of transverse passageways, such as passageways 356-357 intersect each primary passageway, such as passageways 351 and 352 respectively. Each transverse passageway such as passageway 356 is adapted to receive one of the fluid connectors, such as the connector 311. The connectors 308-311 are dimensioned to be received in outlets 260-263 respectively a fluid tight fit.

Considering now the printed circuit board 303 in greater detail with references to FIGS. 2 and 4, the printed circuit board 303 generally comprises a mounting board 304 having a centrally disposed annular opening 306. The board 304 is generally rectangularly shaped and is dimensioned to be received within the recess 305. As best seen in FIG. 2, the annular openings 306 and 307 are sufficiently larger to allow the fluid conductors 367 and 369 to pass therethrough for connecting to a T-connector 300 disposed in the upper surface of the tool 11.

A group of eight spaced apart high electrical current male connectors 384-391 are disposed around the opening 306 in a generally circular configuration that corresponds to the circular configuration of the female connectors 284-291 disposed on the printed circuit board 203. The male connectors 384-391 extend through the board 303 and upwardly at a sufficient height to be fully received within corresponding ones of the females connectors 284-291 when the upper robotic section 15 and the lower tool section 16 are engaged matingly together (FIG. 4). The connectors 384-391 are secured to the board 34 by any convenient securing means, such as soldering or a set of nuts 359-365. The lower end of each connector 384-391 is threaded and is adapted to receive thereon a high current conductor from the tool 11, such as the conductors 300-303.

For the purposes of establishing an electrical communication path for thermocouple signals from the tool 11 to the robotic unit 14, the board 304 includes four groups of nine thermocouple connectors shown generally at 393-400. Each group includes at least two thermocouple pins for engaging the board 204, such as pins 393-394.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A tool adaptor for coupling a robotic controlled tool to a robotic unit, said adaptor comprising:
 coupling means disposed intermediate the tool and the robotic unit;
 means defining a centrally disposed cavity in said coupling means for helping to facilitate supplying power to the tool;
 means defining a robotic power passageway between the robotic unit and said means defining a cavity for permitting source power supplied through the robotic unit to be interconnected to the tool;
 means defining a tool power passageway between the tool and said means defining a cavity for permitting source power supplied through the robotic unit to be interconnected to the tool;
 fastening means for attaching said coupling means intermediate the tool and the robotic unit;

means for mounting said fastening means to said coupling means, wherein said means defining a cavity is disposed intermediate said means for mounting;

wherein said coupling means includes tool coupling means secured to the tool for helping to couple electrical power to the tool, robotic couplings means for supporting from above said tool coupling means, said robotic coupling means being adapted to be secured to the robotic unit, and engaging means partially disposed in said robotic coupling means and partially disposed in said tool coupling means for securing matingly removably together said robotic coupling means and said tool coupling means;

wherein said robotic coupling means including means defining a large centrally disposed opening, said opening being sufficiently large to receive therein a plurality of electrical conductors, and said tool coupling means including another large centrally disposed opening, said other opening being sufficiently large to receive therein a plurality of electrical conductors;

wherein said coupling means further includes connector means for coupling electrical power between the robotic unit and the robotic controlled tool;

wherein said coupling means further includes means for mounting said connector means within said cavity; and wherein said means for mounting includes a robotic coupled printed circuit board having a group of downwardly depending electrical connectors adapted to be coupled to the robotic unit and a tool coupled printed circuit board having a group of upwardly depending electrical connectors adapted to be coupled to the robotic controlled tool.

2. A tool adaptor according to claim 1, wherein said coupling means further includes means for mounting said connector means within said cavity.

3. A tool adaptor according to claim 1 further comprising:

means for mounting said robotic coupled printed circuit board within the robotic coupling means opening;

means for mounting said tool coupled printed circuit board within the tool coupling means; and said upwardly extending electrical conductors being adapted to matingly engage in a friction tight electrical fit said downwardly depending electrical conductors when said robotic coupling means and said tool coupling means are secured together, so that electrical power may be supplied to the tool in a low profile stacked configuration.

4. A tool adapter according to claim 1 where said connector means further includes thermocouple means for coupling a plurality of thermocouple signals to the robotic unit;

said thermocouple means including a group of thermocouple connectors disposed in said robotic coupled printed circuit board, said group of thermocouple connectors being adapted to be electrically connected to the robotic unit;

said thermocouple means further including another group of thermocouple connectors disposed in said tool coupled printed circuit board, said other of thermocouple connectors being adapted to be electrically connected to the tool; and said group of thermocouple connectors and said other group of thermocouple connectors being adapted to matingly engage in a friction tight electrical fit for establishing an electrical path therebetween when said robotic coupling means and said tool coupling means are jointed matingly together.

5. A tool adapter according to claim 1 wherein said robotic coupling means includes universal robotic coupler means for attaching different types and kinds of robotic units for manipulating the robotic controlled tool.

6. A tool adapter according to claim 5 wherein said universal robotic coupling means is an annular shaped ring having a flange with a plurality of spaced apart apertures.

7. A tool adapter according to claim 6 wherein said ring is adapted to receive a clamp for securing the tool adapter to the robotic arm.

8. A tool adaptor for coupling a robotic controlled tool to a robotic unit, said adaptor comprising:

coupling means disposed intermediate the tool and the robotic unit;

means defining a centrally disposed cavity in said coupling means for helping to facilitate supplying power to the tool;

means defining a robotic power passageway between the robotic unit and said means defining a cavity for permitting source power supplied through the robotic unit to be interconnected to the tool; and means defining a tool power passageway between the tool and said means defining a cavity for permitting source power supplied through the robotic unit to be interconnected to the tool;

fastening means for attaching said coupling means intermediate the tool and the robotic unit;

means for mounting said fastening means to said coupling means, wherein said means defining a cavity is disposed intermediate said means for mounting;

wherein said coupling means includes tool coupling means secured to the tool for helping to couple electrical power to the tool, robotic couplings means for supporting from above said tool coupling means, said robotic coupling means being adapted to be secured to the robotic unit, and engaging means partially disposed in said robotic coupling means and partially disposed in said tool coupling means for securing matingly removably together said robotic coupling means and said tool coupling means;

wherein said robotic coupling means including means defining a large centrally disposed opening, said opening being sufficiently large to receive therein a plurality of electrical conductors, and said tool coupling means including another large centrally disposed opening, said other opening being sufficiently large to receive therein a plurality of electrical conductors; and wherein said robotic coupling means includes at least one fluid connector for receiving fluid under pressure from the robotic unit, said robotic coupling means further including a robotic fluid passageway for coupling the fluid under pressure to the tool, and said robotic fluid passageway having an inlet in fluid communication with said fluid connector and an outlet for discharging the fluid therefrom.

9. A tool adapter according to claim 8 wherein said tool coupling means includes at least one fluid discharge connector for supplying fluid under pressure to the surface mount tool;

said tool coupling means including another fluid passageway for coupling the fluid under pressure to the tool;

fluid coupling means in fluid communication with said other fluid passageway, said fluid coupling means being adapted to engage in said outlet in a fluid tight fit; and said fluid coupling means further including at least one fluid distributor for supplying fluid to the tool.

10. A tool changing system for use with a robotic unit having a robotic arm, said system comprising:

a low profile tool adaptor for attaching a robotic controlled tool to the robotic unit;

tool support stand means for supporting a portion of said low profile tool adaptor so that the tool may be attached to the robotic unit;

said low profile tool adaptor including robotic changer means and tool changer means;

said robotic changer means having a plurality of electrical connectors for supplying electrical power to said tool, said robotic changer means being attached removably to the robotic unit;

said tool changer means being secured removably to said tool for supporting it from above;

said tool changer means having connector means for supplying electrical power to said tool, said connector means being adapted to engage matingly said plurality of electrical connectors;

coupling means partially disposed in said robotic changer means and partially disposed in said tool changer means for securing removably said tool changer means to said robotic changer means;

means for causing said coupling means to engage matingly said plurality of electrical connectors with said connectors means for supplying electrical power to the tool; and said tool support stand means including means for supporting said tool changer means in alignment between said robotic changer means and said motor means to facilitate said means engaging said coupling means to secure removably together said robotic changer means and said lower tool changer means; and wherein said coupling means includes a pair of printed circuit boards, one of said printed circuit boards being mounted removably to the robotic changer means and the other one of said printed circuit boards being mounted removably to the tool changer means;

one of said printed circuit boards having a plurality of female electrical connectors and the other one of said printed circuit boards having a plurality of male electrical connectors; and said male and female electrical connectors being disposed in aligning relationship to enable said male connectors to be received within said female connectors when said robotic changer means and said tool changer means are secured removably together.

11. A tool changing system according to claim 10 further comprising:

connecting means for mounting removably said robotic changer means to the robotic unit.

12. A tool changing system according to claim 11, wherein said connecting means includes a universal coupler means for enabling said robotic changer means to be attached removably to different types and kinds of robotic units.

13. A tool changing system according to claim 12, wherein said universal coupler means includes a clamp for securing removably the robotic changer means to the robotic unit.

14. A tool changing system according to claim 12, wherein said robotic changer means includes mounting means for securing said universal coupler means to the upper surface of said robotic changer means.

15. A tool changing system according to claim 10 wherein one of said printed circuit boards further includes a plurality of male thermocouple connectors for supplying thermocouple signals from said tool and the other one of said printed circuit boards having a plurality of female thermocouple connectors adapted to be connected to the robotic unit; and said male and female thermocouple connectors being disposed in aligning relationship to enable said male connectors to engage said female connectors when said robotic changer means and said tool changer means are secured removably together.

16. A tool changing system according to claim 15 wherein said plurality of connector includes at least one air connector for supplying air from the robotic unit and at least one vacuum connector for supplying a pneumatic pressure from the robotic unit; and wherein said connector means includes at least one mating air connector for supplying the air to the tool and at least one mating vacuum connector for supplying the pneumatic pressure to the tool.

17. A tool changing system according to claim 10 wherein said coupling means further includes a pair of spaced-apart oppositely disposed bolts, each having a threaded slotted shaft adapted engaging matingly said motor means; and a pair of spaced-apart oppositely disposed nuts, each nut being adapted for receiving threadably a corresponding one of said bolts.

18. A tool changing system according to claim 17 wherein one of said bolts and one of said corresponding nuts have a right handed threaded pitch and the other ones of said bolts and nuts have a left handed threaded pitch for helping to relieve linear forces exerted against the robotic unit as said robotic changer means and said tool changer means are secured removably together.

* * * * *